United States Patent
Kerns

(10) Patent No.: US 6,233,924 B1
(45) Date of Patent: *May 22, 2001

(54) TEMPERATURE CONTROL METHOD FOR A DIRECT INJECTION ENGINE

(75) Inventor: James Michael Kerns, Trenton, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/366,016

(22) Filed: Aug. 2, 1999

(51) Int. Cl.$^7$ ....................................................... F01N 3/00
(52) U.S. Cl. ................. 60/284; 60/274; 60/286; 60/284; 123/520
(58) Field of Search ............................ 60/284, 274, 283, 60/286, 301; 123/520; 436/37

(56) References Cited

U.S. PATENT DOCUMENTS

| | | |
|---|---|---|
| 5,245,975 | 9/1993 | Ito . |
| 5,438,967 | 8/1995 | Ito . |
| 5,657,625 | 8/1997 | Koga et al. . |
| 5,765,372 * | 6/1998 | Mitobe et al. ........................ 60/301 |
| 5,806,304 | 9/1998 | Price et al. . |
| 5,910,096 * | 6/1999 | Hepburn et al. ...................... 60/274 |
| 5,950,603 * | 9/1999 | Cook et al. ......................... 123/520 |
| 5,998,210 * | 12/1999 | Hepburn et al. ...................... 436/37 |
| 6,044,831 * | 4/2000 | Takagi et al. ....................... 123/520 |

FOREIGN PATENT DOCUMENTS

411351080A * 12/1999 (JP) .

* cited by examiner

Primary Examiner—Thomas Denion
Assistant Examiner—Thai-Ba Trieu
(74) Attorney, Agent, or Firm—John D. Russell; Julia Voutyras

(57) ABSTRACT

A fuel vapor purging method controls fuel vapor purging during stratified operation. Several factors influence vapor purge control, including fuel vapor concentration in the cylinder and temperature of the emission control device. The fuel vapor passes through the cylinder unburned by maintaining the concentration within allowable limits. The unburned fuel vapor reacts exothermically in the emission control device thereby generating heat. To guarantee that the fuel vapor reacts in the first emission control device, the fuel vapor purge is restricted to a certain temperature range. To guarantee that the fuel vapor does not burn in the cylinder, the concentration is kept to a restricted value.

19 Claims, 6 Drawing Sheets

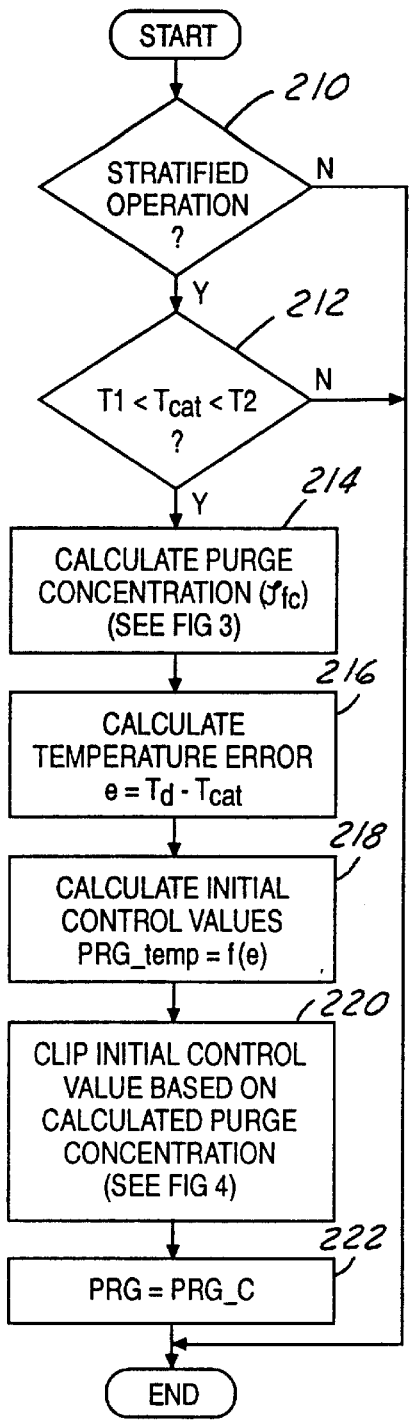
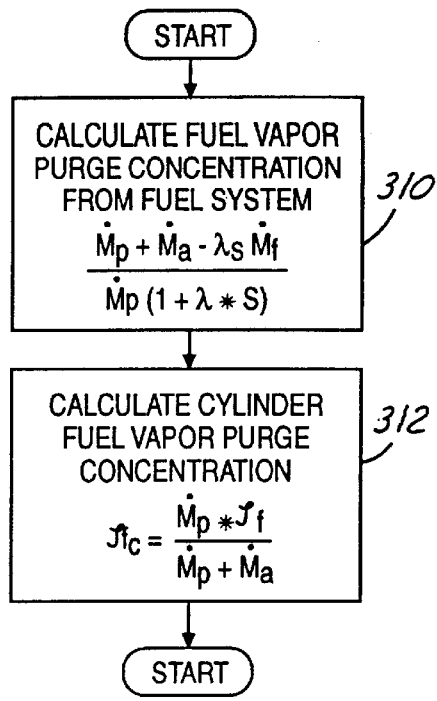
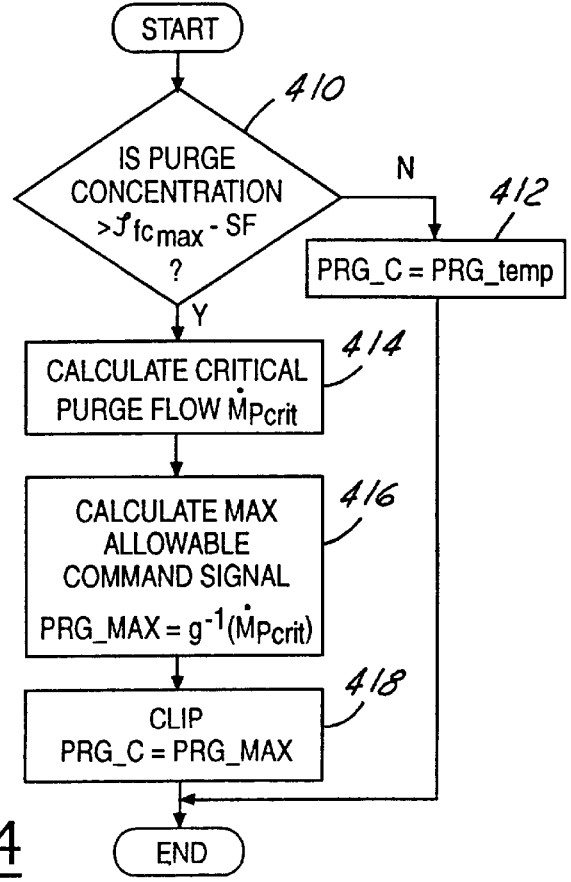
FIG. 2
FIG. 3
FIG. 4

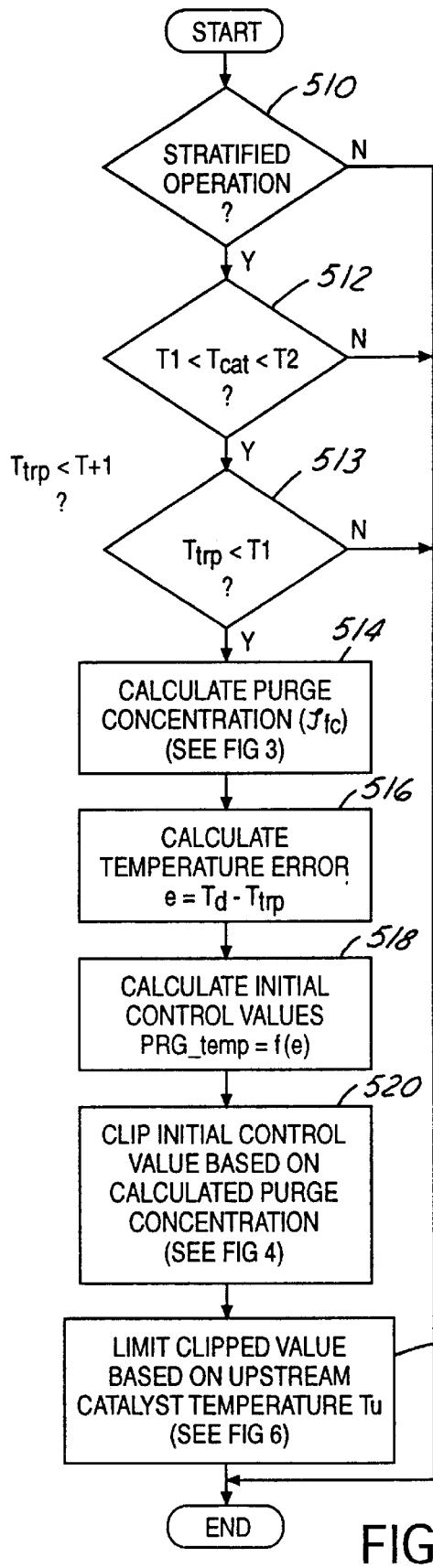
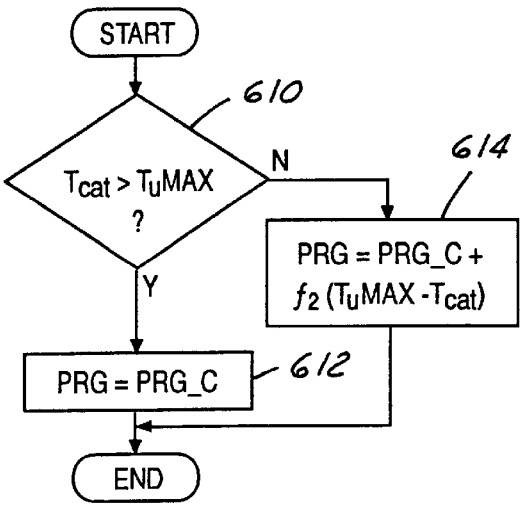
FIG. 6
FIG. 5

TEMPERATURE CONTROL METHOD FOR A DIRECT INJECTION ENGINE

FIELD OF THE INVENTION

The field of the invention relates to fuel vapor purge in direct injection spark ignition engines.

BACKGROUND OF THE INVENTION

In direct injection spark ignition engines, the engine operates at or near wide-open throttle during stratified air/fuel operation in which the combustion chambers contain stratified layers of different air/fuel mixtures. The strata closest to the spark plug contains a stoichiometric mixture or a mixture slightly rich of stoichiometry, and subsequent strata contain progressively leaner mixtures. The engine may also operate in a homogeneous mode of operation with a homogeneous mixture of air and fuel generated in the combustion chamber by early injection of fuel into the combustion chamber during its intake stroke. Homogeneous operation may be either lean of stoichiometry, at stoichiometry, or rich of stoichiometry.

Direct injection engines are also coupled to conventional three-way catalytic converters to reduce CO, HC, and NOx. When operating at air/fuel mixtures lean of stoichiometry, a NOx trap or catalyst is typically coupled downstream of the three-way catalytic converter to further reduce NOx.

Direct injection engines are also coupled to fuel vapor recovery systems to allow purging of fuel vapors. Conventional systems allow fuel vapor purging in the stratified mode only when the catalyst temperature is high enough to convert the unburned hydrocarbons. In other words, since the fuel vapor is inducted with the fresh charge, it forms a homogenous air/fuel mixture. Then, when the fuel is directly injected during the compression stroke to form a stratified mixture, only the stratified fuel burns since the homogenous fuel vapor mixture is too lean. Therefore, unburned fuel vapor may exit the engine cylinder. In some circumstances, to remove these vapors, the catalytic converter may have to be above a certain temperature, known to those skilled in the art as the light-off temperature. Therefore, fuel vapor purging during the stratified mode is restricted until the catalyst has reached this light-off temperature. Such a method is described in U.S. Pat. No. 5,245,975.

The inventor herein has recognized a disadvantage with the above approach. When operating in the stratified mode, less heat is generated to increase or maintain catalyst or NOx trap temperature. Thus, it takes a long time after a cold start before purging is allowed. Also, with some catalyst formulations and catalyst configurations, the catalyst may not maintain this light-off temperature during certain conditions and purging is only possible in the homogeneous mode, thereby reducing fuel economy and allowable purge time. In other words, when operating in the stratified mode, catalyst or NOx trap temperature may fall below the light-off temperature, preventing purge and thereby limiting stratified operation.

SUMMARY OF THE INVENTION

An object of the invention herein is to generate heat in an emission control device coupled to an engine.

The above object is achieved, and problems of prior approaches overcome, by a method for generating heat in an emission control device coupled to an engine having multiple combustion chambers, the method comprising operating in a stratified mode where fuel is injected during a compression stroke of the engine, and purging fuel vapors into the combustion chambers that will pass through the chambers unburned, thereby providing unburned hydrocarbons and excess oxygen to react exothermically and generate heat in the emission control device.

By purging fuel vapors during stratified operation, the fuel vapors are inducted into the cylinder and form a homogeneous mixture that is too lean to combust, even when the engine is operating in a stratified mode. These unburned fuel vapors, along with oxygen from the unburned portion of the charge inducted, will react exothermically in the emission control device. This exothermic reaction will generate heat that will increase the emission control device to a desired level. By monitoring and controlling the amount of fuel vapor ingested into the cylinders, this exothermic reaction can be used to maintain the catalyst temperature under conditions where the temperature would otherwise be lower than desired for maximum system efficiency.

An advantage of the present invention is increased fuel vapor purging during stratified operation.

Another advantage of the present invention is increased stratified operation and therefore increased fuel economy.

Yet another advantage of the present invention is decreased emissions.

Still another advantage of the present invention is that the addition of fuel vapor purge produces minimal, slowly changing, additional torque, allowing smooth transitions into and out of fuel vapor purge operation.

Other objects, features and advantages of the present invention will be readily appreciated by the reader of this specification.

BRIEF DESCRIPTION OF THE DRAWINGS

The object and advantages of the invention claimed herein will be more readily understood by reading an example of an embodiment in which the invention is used to advantage with reference to the following drawings wherein:

FIGS. 2–10 are high level flowcharts describing a portion of operation of the embodiment shown in FIG. 1.

DESCRIPTION OF AN EMBODIMENT

Figure 1:
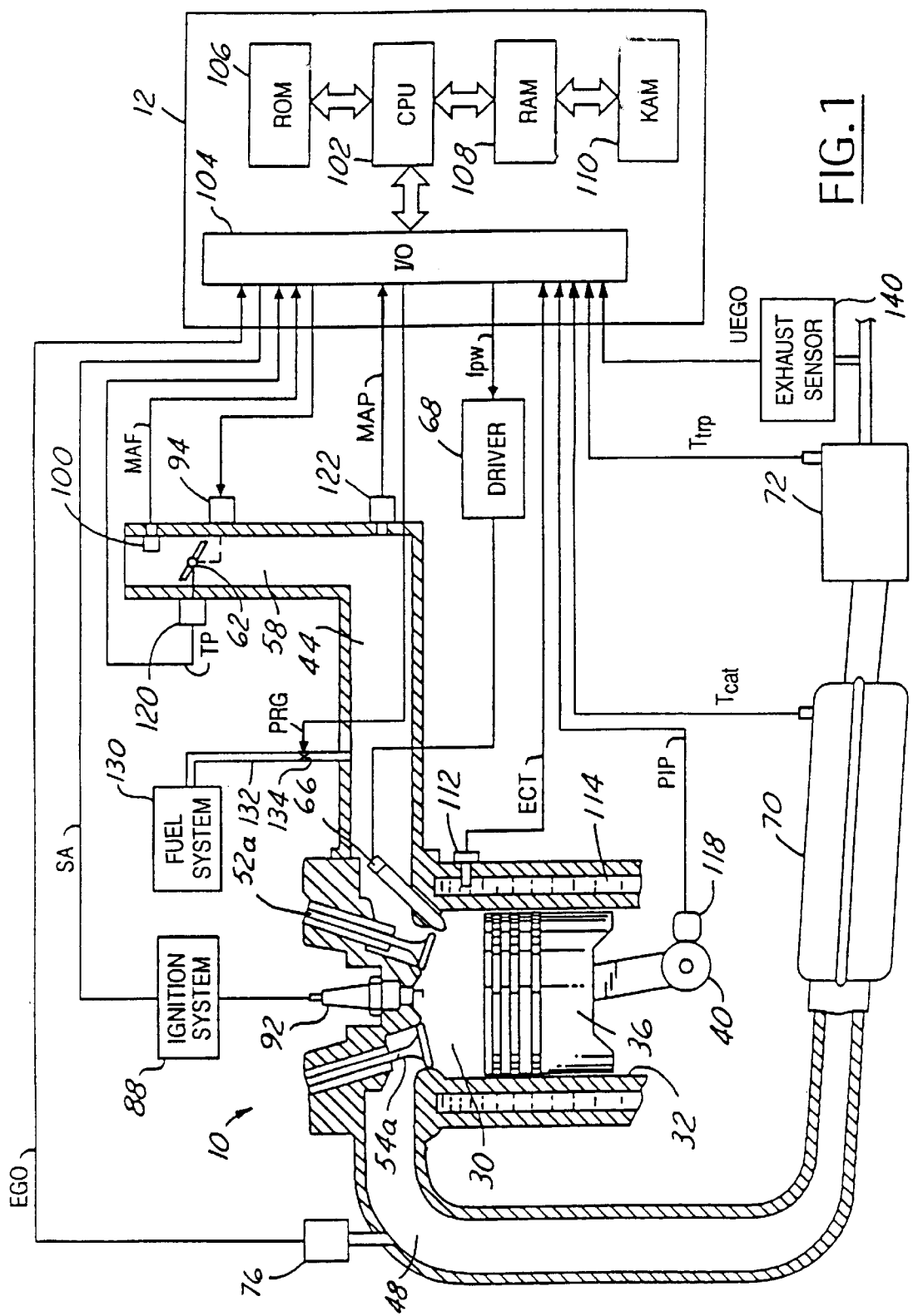
FIG. 1 is a block diagram of an embodiment in which the invention is used to advantage.

Direct injection spark ignited internal combustion engine 10, comprising a plurality of combustion chambers, is controlled by electronic engine controller 12. Combustion chamber 30 of engine 10 is shown in FIG. 1 including combustion chamber walls 32 with piston 36 positioned therein and connected to crankshaft 40. In this particular example, piston 30 includes a recess or bowl (not shown) to help in forming stratified charges of air and fuel. Combustion chamber 30 is shown communicating with intake manifold 44 and exhaust manifold 48 via respective intake valves 52a and 52b (not shown), and exhaust valves 54a and 54b (not shown). Fuel injector 66 is shown directly coupled to combustion chamber 30 for delivering liquid fuel directly therein in proportion to the pulse width of signal fpw received from controller 12 via conventional electronic driver 68. Fuel is delivered to fuel injector 66 by a conventional high pressure fuel system (not shown) including a fuel tank, fuel pumps, and a fuel rail.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94. This configuration is commonly referred to as electronic throttle control (ETC) which is also utilized during idle speed control. In an alternative embodiment (not shown), which is well known to those skilled in the art, a bypass air passageway is arranged in parallel with throttle plate 62 to control inducted airflow during idle speed control via a throttle control valve positioned within the air passageway.

Exhaust gas oxygen sensor 76 is shown coupled to exhaust manifold 48 upstream of catalytic converter 70. In this particular example, sensor 76 provides signal UEGO to controller 12 which converts signal UEGO into a relative air/fuel ratio $\lambda$. Signal UEGO is used to advantage during feedback air/fuel control in a conventional manner to maintain average air/fuel at a desired air/fuel ratio.

Conventional distributorless ignition system 88 provides ignition spark to combustion chamber 30 via spark plug 92 in response to spark advance signal SA from controller 12.

Controller 12 causes combustion chamber 30 to operate in either a homogeneous air/fuel mode or a stratified air/fuel mode by controlling injection timing. In the stratified mode, controller 12 activates fuel injector 66 during the engine compression stroke so that fuel is sprayed directly into the bowl of piston 36. Stratified air/fuel layers are thereby formed. The strata closest to the spark plug contains a stoichiometric mixture or a mixture slightly rich of stoichiometry, and subsequent strata contain progressively leaner mixtures. During the homogeneous mode, controller 12 activates fuel injector 66 during the intake stroke so that a substantially homogeneous air/fuel mixture is formed when ignition power is supplied to spark plug 92 by ignition system 88. Controller 12 controls the amount of fuel delivered by fuel injector 66 so that the homogeneous air/fuel mixture in chamber 30 can be selected to be at stoichiometry, a value rich of stoichiometry, or a value lean of stoichiometry. The stratified air/fuel mixture will always be at a value lean of stoichiometry, the exact air/fuel being a function of the amount of fuel delivered to combustion chamber 30. An additional split mode of operation wherein additional fuel is injected during the exhaust stroke while operating in the stratified mode is available. An additional split mode of operation wherein additional fuel is injected during the intake stroke while operating in the stratified mode is also available, where a combined homogeneous and split mode is available.

Nitrogen oxide (NOx) absorbent or trap 72 is shown positioned downstream of catalytic converter 70. NOx trap 72 absorbs NOx when engine 10 is operating lean of stoichiometry. The absorbed NOx is subsequently reacted with HC and catalyzed during a NOx purge cycle when controller 12 causes engine 10 to operate in either a rich homogeneous mode or a stoichiometric homogeneous mode.

Controller 12 is shown in FIG. 1 as a conventional microcomputer including: microprocessor unit 102, input/output ports 104, an electronic storage medium for executable programs and calibration values, shown as read-only memory chip 106 in this particular example, random access memory 108, keep alive memory 110, and a conventional data bus.

Controller 12 is shown receiving various signals from sensors coupled to engine 10, in addition to those signals previously discussed, including: measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40; throttle position TP from throttle position sensor 120; and absolute Manifold Pressure Signal MAP from sensor 122. Engine speed signal RPM is generated by controller 12 from signal PIP in a conventional manner and manifold pressure signal MAP provides an indication of engine load.

In this particular example, temperature Tcat of catalytic converter 70 and temperature Ttrp of NOx trap 72 are inferred from engine operation as disclosed in U.S. Pat. No. 5,414,994, the specification of which is incorporated herein by reference. In an alternate embodiment, temperature Tcat is provided by temperature sensor 124 and temperature Ttrp is provided by temperature sensor 126.

Fuel system 130 is coupled to intake manifold 44 via tube 132. Fuel vapors (not shown) generated in fuel system 130 pass through tube 132 and are controlled via purge valve 134. Purge valve 134 receives control signal PRG from controller 12.

Generating Heat in an Emission Control Device

Heat generated in an emission control device can be used to advantage to, for example, rapidly increase temperature of the device to obtain faster light-off during a cold start, control temperature of the device to obtain optimum conversion efficiency, purge the device to remove sulfur contamination, or many other applications where it is advantageous to generate heat in the device. Heat is generated in the device by providing unburned fuel vapor (HC) from fuel system 130 along with excess oxygen from lean combustion. This is done by operating the engine in a stratified mode and introducing fuel vapors during the induction stroke, thereby forming a homogeneous fuel vapor mixture at a lean air/fuel ratio that will not support burning of the fuel vapor. Therefore, the fuel vapors pass through the cylinder unburned and react exothermically with the excess oxygen since the overall air/fuel ratio is still lean of stoichiometry.

According to the present invention, the device can be any emission control device such as a three-way catalytic converter or a NOx trap. In the embodiment described by FIG. 1, the upstream device is catalyst 70. In an alternative embodiment (not shown), the upstream device may be trap 72.

Limiting Fuel Vapor Purge Based on Emission Control Device Temperature

In order to maximize the heat generated from fuel vapor and excess oxygen exothermically reacting, the emission control device should be greater than a lower threshold but less than a upper threshold. The lower threshold represents the temperature above which exothermic reactions are supported. Note that this threshold temperature for supporting exothermic reactions is different than the light-off temperature, since the light-off temperature is the temperature at which the emission control device reaches high efficiency in converting certain compounds into alternate compounds, thereby reducing certain regulated emissions.

The upper threshold represents a temperature at which the emission control device reaches high efficiency and no longer needs additional heat. Note that the upper threshold may be equal to the light-off temperature. Also, the upper and lower thresholds are a function of catalyst washcoat chemistry.

Calculating Cylinder Fuel Vapor Concentration

To calculate cylinder fuel vapor concentration ($\rho_{fc}$), fuel vapor concentration ($\rho_f$) from the fuel vapor system is first calculated according to the following equation:

$$\rho_f = \frac{\dot{m}_p + \dot{m}_a - \lambda S \dot{m}_f}{\dot{m}_p(1+\lambda S)}$$

Cylinder fuel vapor concentration ($\rho_{fc}$) is calculated as:

$$\rho_{fc} = \frac{\dot{m}_p \rho_f}{(\dot{m}_p + \dot{m}_a)}$$

where ($\dot{m}_p$) is total purge flow rate, ($\dot{m}_f$) is actual fuel flow rate from the fuel injectors, ($\dot{m}_a$) is fresh charge measured by the air flow meter, ($\lambda$) is measured relative air/fuel ratio in the exhaust, and S is the stoichiometric air/fuel ratio.

The fuel vapor concentration ($\rho_f$) is thereby calculated based on total purge flow rate ($\dot{m}_p$) from the fuel vapor system, fresh charge measured by the air flow meter ($\dot{m}_a$), the relative air/fuel ratio in the exhaust ($\lambda$), the fuel flow rate from the fuel injectors ($\dot{m}_f$), and the stoichiometric air/fuel ratio S. The cylinder fuel vapor concentration ($\rho_{fc}$) is then based on fuel vapor concentration ($\rho_f$), total purge flow rate ($\dot{m}_p$), and fresh charge measured by the air flow meter ($\dot{m}_a$).

In this way, and according to the above equations, the cylinder fuel vapor concentration ($\rho_{fc}$) is calculated based on available information and can be used to advantage. For example, the calculated cylinder fuel vapor concentration ($\rho_{fc}$) can be used to estimate expected emissions using characteristic relationships between cylinder vapor concentration and certain regulated emissions. Further, cylinder fuel vapor concentration ($\rho_{fc}$) can be used to control many engine control signals such as, for example, ignition timing or injection timing during stratified operation. For example, when operating in a split mode where fuel vapor purge forms the homogenous mixture and direct fuel injection during forms the stratified mixture, the fuel injection timing during the compression stroke to form the stratified fuel is adjusted based on the cylinder vapor concentration to obtain maximum torque.

Limiting Fuel Vapor Purge Based on Cylinder Fuel Vapor Concentration

In order to generate heat in the emission control device from the exothermic reaction of fuel vapor and excess oxygen, the fuel vapor must pass through the cylinder unburned. To guarantee fuel vapor passes unburned, cylinder fuel vapor concentration is limited by a maximum allowable purge concentration ($\rho_{fc_{Max}}$). In other words, the calculated cylinder fuel vapor concentration ($\rho_{fc}$) can be compared to the maximum allowable purge concentration ($\rho_{fc_{MAX}}$) and used to limit the amount of total purge flow rate ($\dot{m}_p$). Allowing the calculated cylinder fuel vapor concentration ($\rho_{fc}$) to exceed the maximum allowable, or critical, purge concentration ($\rho_{fc_{MAX}}$) may also cause a change in engine torque.

In a preferred embodiment, the maximum allowable, or critical, total purge flow ($\dot{m}_{p_{crit}}$) is given as:

$$\dot{m}_{p_{crit}} = \frac{\rho_{fc_{max}} \dot{m}_a (1+\lambda S) - \dot{m}_a + \lambda S \dot{m}_f}{\rho_{fc_{max}} + \lambda S \rho_{fc_{max}} - 1}$$

Therefore, to prevent cylinder fuel vapor concentration ($\rho_{fc}$) from exceeding the maximum allowable, or critical, purge concentration ($\rho_{fc_{MAX}}$), purge valve 134 is controlled to limit total purge flow ($\dot{m}_p$) to the maximum allowable, or critical, total purge flow ($\dot{m}_{p_{crit}}$). In this way, fuel vapor purge will pass through the cylinder unburned, allowing exothermic reaction in an emission control device and preventing a change in engine torque.

If cylinder fuel vapor concentration ($\rho_{fc}$) exceeds the maximum allowable, or critical, purge concentration ($\rho_{fc_{MAX}}$), then addition engine torque will be produced since some fuel vapors will burn during the engine power stroke. Under these conditions, other engine control variables are used to keep engine torque constant such as, for example, fresh air charge, ignition timing, exhaust gas recirculation, fuel injection amount, fuel injection timing, and/or variable cam timing. For example, rapid engine torque control can be achieved by using ignition timing or fuel injection amount. In particular, if using fuel injection amount, the amount of fuel injection amount adjustment can be determined by estimating an amount of fuel vapor purge that is burned, and this amount subtracted from the normal fuel injection amount. The following equation shows the calculation, where fia_c is the adjusted fuel injection amount, fia is the normal fuel injection amount (when fuel vapor purge does not exceed the maximum allowable concentration), and fvp_b is the amount of fuel vapor purge burned (determined using predetermined maps relating how far the actual purge concentration exceeds the maximum allowable concentration):

fia_c=fia—fvp_b

If one of the other engine control variables is used, predetermined characteristic maps relating engine torque to the control variable are used to maintain constant engine torque.

Discontinuing Stratified Fuel Vapor Purge

In some cases, limiting fuel vapor purge based on a maximum allowable fuel vapor cylinder concentration causes insufficient purging to keep a vapor system from becoming saturated. Thus, is some cases it is necessary to discontinue stratified fuel vapor purging when the actual limited fuel vapor purge is less than a desired value. In this case, either a split mode or homogenous mode is selected to allow maximum fuel vapor purge, where the fuel vapor purge is burned in the cylinder.

For example, when actual fuel vapor purge (limited or clipped in any way, or determined through temperature control as described later herein), is less than a minimum required value, operation where fuel vapor purge passes through the cylinder is discontinued. The engine switches to either a purely homogenous mode or a split mode where purge is not limited or clipped and increase fuel vapor purge is possible. In these modes, the fuel vapor purge is burned in the cylinder and does not create an exothermic reaction in the catalyst.

Using Cylinder Fuel Vapor to Control Emission Device Temperature

As stated previously herein, heat generated by purging fuel vapors during stratified operation can be used to control temperature of the emission control device when the exothermic reaction is taking place. For example, the amount of fuel vapor purge, which is proportional to exothermic heat creating in the emission control device, can be controlled to maintain a desired emission control device temperature. When the emission control device temperature falls below a desired value and the engine is operating stratified, fuel vapor from fuel system 130 can be introduced into the cylinder and pass to the emission control device unburned. The fuel vapor then reacts exothermically in the emission control device, thereby generating heat and increasing temperature of the emission control device. As the temperature of the emission control device approaches the desired value, less fuel vapor purge is introduced, thereby causing temperature of the emission control device to converge to the desired level.

Opportunistic Fuel Vapor Purge Based on Emission Control Device Temperature

When the emission control device temperature is in a lower portion of an acceptable range, fuel vapor purge can be allowed to take advantage of a fuel vapor purge opportunity. In other words, if it is necessary to purge fuel vapor because fuel vapor storage has become saturated, fuel vapor purge can be enabled as long as the emission control device can tolerate increased temperature. In this way, increased fuel vapor purge time is obtained while keeping the emission control device within acceptable temperature limits.

Using Cylinder Fuel Vapor Concentration to Control A Second Emission Device Temperature Downstream of A First Emission Control Device In addition, heat generated by purging fuel vapors during stratified operation can also be used to control temperature of a second emission control device downstream of the emission control device where the exothermic reaction is taking place. In other words, the heat generated in the upstream device also affects the downstream emission control device temperature and thus can be used to control the temperature of the downstream emission control device.

While controlling downstream device temperature, limits on control authority for limiting exothermic reaction in the upstream device are necessary to prevent upstream device temperature from becoming greater than a maximum allowable device temperature. In this configuration, fuel vapor purge is controlled according to a difference between a desired minimum temperature for the downstream emission control device and actual temperature of the downstream emission control device.

Also, combined temperature control is possible where fuel vapor purge is controlled to maintain both temperature of the upstream and downstream emission control device. In this configuration, fuel vapor is controlled according to both the difference between a desired minimum temperature for the downstream emission control device and actual temperature of the downstream emission control device and the difference between a desired minimum temperature for the upstream emission control device and actual temperature of the upstream emission control device.

Discontinuing Stratified Fuel Vapor Purge Based on Total Fuel Used to Produce the Current Desired Torque By injecting fuel vapors into the engine during stratified operation and allowing them to pass through unburned to maintain emission control device temperature, stratified operation is extended, thus giving a fuel economy benefit. However, if the total amount of fuel used in this operation mode, including fuel vapor and fuel injected to the form strata that are burning, is greater than the amount of fuel that would be used during homogeneous operation to produce equal engine torque, then fuel economy is degraded by continuing stratified operation. Stated another way, when the stratified mode no longer provides a fuel savings because of the additional fuel vapor injected to maintain temperature of the emission control device, the engine air/fuel operating mode is switched to the homogeneous mode thereby maximizing fuel economy. In addition, fuel vapor purge during the homogenous mode is still allowed since the additional fuel vapor will burn and produce engine torque.

To determine the mode, the following criteria is used:

$$\rho_f \dot{m}_p + \dot{m}_f \not> \dot{m}_{f_{stoich}}$$

where, ($\dot{m}_{f_{stoich}}$) is the amount of fuel necessary during homogenous operation to produce equal engine torque to that produced by actual fuel flow rate from the fuel injectors $\dot{m}_f$ during stratified mode. As the engine switches to the homogeneous mode, the new fuel flow rate from the fuel injectors ($\dot{m}_{f_h}$) is found as:

$$\dot{m}_{f_h} = \dot{m}_{f_{stoich}} - \rho_f \dot{m}_p$$

when fuel vapor purge is continued in the homogenous mode.

Referring now to FIG. 2, a routine for controlling temperature (Tcat) of catalyst 70 is described. First, in step 210 a determination is made as to whether engine 10 is operating in a stratified mode where fuel is injected directly into cylinder 30 during a compression stroke. When the answer to step 210 is YES, a determination is made as to whether temperature Tcat of catalyst 70 is between threshold values T1 and T2. Threshold value T2 represents an upper level above which catalyst 70 is operating a peak efficiency and thus control of temperature (Tcat) is not required. Temperature threshold T1 represents a lower level below which catalyst 70 cannot support an exothermic reaction between unburned fuel vapors and excess oxygen. When catalyst temperature Tcat is within this range, the routine continues to step 214, where the fuel vapor concentration ($\rho_{fc}$) in the cylinder is calculated, as will be described later herein with particular reference to FIG. 3.

Continuing with FIG. 2, a temperature error (e) is calculated in step 216 based on a desired temperature (Td) of catalyst 70 and the actual temperature (Tcat) of catalyst 70. Then, in step 218, an initial control value (PRG_temp) is calculated based on a function (f) of error (e). In a preferred embodiment, function (f) represents a proportional, integral, and derivative controller, known to those skilled in the art as a PID controller. Then, in step 220, the initial control value (PRG_temp) is clipped based on the calculated fuel vapor concentration ($\rho_{fc}$) in the cylinder, as described later herein with particular reference to FIG. 4. This operation prevents the temperature controller from adding too much fuel vapor from fuel system 130 and creating a combustible fuel vapor concentration in the cylinder. Finally, in step 222, control signal PRG is calculated based on the clipped value (PRG_c).

Referring now to FIG. 3, a routine for calculating the concentration of fuel vapors from fuel system 130 ($\rho_f$) and cylinder fuel vapor concentration ($\rho_{fc}$) is described. First, in step 310, the concentration of fuel vapors from fuel system 130 is calculated as:

$$\rho_f = \frac{\dot{m}_p + \dot{m}_a - \lambda S \dot{m}_f}{\dot{m}_p(1 + \lambda S)}$$

Then, in step 312, the cylinder fuel vapor concentration ($\rho_{fc}$) is calculated as:

$$\rho_{fc} = \frac{\dot{m}_p \rho_f}{(\dot{m}_p + \dot{m}_a)}$$

where $\dot{m}_p$ is the total purge flow rate, $\dot{m}_f$ is the fuel flow rate from the fuel injectors, $\dot{m}_a$ is fresh charge measured by the air flow meter, $\lambda$ is the measured relative air/fuel ratio from the UEGO sensor, and S is the stoichiometric air/fuel ratio. Total purge flow rate, $\dot{m}_p$ is determined based on the previous control signal PRG where:

$$\dot{m}_p = g(PRG)$$

where (g) is a predetermine function relating command signal PRG to total flow rate, $\dot{m}_p$. Thus, it is possible to estimate the actual fuel vapor concentration from fuel system 130 and cylinder fuel vapor concentration from available measurements.

Referring now to FIG. 4, in step 410 a determination is made as to whether purge concentration is greater than the maximum allowable purge concentration ($\rho_{fc_{MAX}}$) to guarantee that the fuel vapors pass the cylinder unburned and react exothermically in catalyst 70. Also, a safety factor, SF is also included. When the answer to step 410 is NO, the clipped control value (PRG_c) is set to initial control value PRG_temp) in step 412. Thus, when the concentration is less than that which will burn in the cylinder, the temperature controller according to FIG. 2 is allowed full authority to change fuel vapor flow through valve 134. Continuing with FIG. 4, when the answer to step 410 is YES, a critical purge flow ($\dot{m}_{p_{crit}}$) is calculated according to the following equation:

$$\dot{m}_{p_{crit}} = \frac{\rho_{fc_{max}} \dot{m}_a (1 + \lambda S) - \dot{m}_a + \lambda S \dot{m}_f}{\rho_{fc_{max}} + \lambda S \rho_{fc_{max}} - 1}$$

This value represents the maximum allowable total purge flow that gives an unburnable fuel vapor concentration in the cylinder. Next, in step 416, the maximum allowable command signal (PRG_MAX) is calculated based on the critical purge flow ($\dot{m}_{p_{crit}}$) and the inverse of function (g). Finally, in step 418, the clipped value (PRG_c) is set equal to the maximum allowable command signal (PRG_MAX). This prevents the temperature control described by FIG. 2 from allowing fuel vapor purge concentration to enter the cylinder that will burn and produce torque. Thus, the system is able to control catalyst temperature while remaining in a stratified mode and keeping combustion torque constant.

Referring now to FIG. 5, an alternative embodiment is described where purge vapors are controlled during stratified operation to maintain temperature (Ttrp) of a NOx trap 72 downstream of catalyst 70. First, in step 510 a determination is made as to whether engine 10 is operating in a stratified mode where fuel is injected directly into cylinder 30 during a compression stroke. When the answer to step 510 is YES, a determination is made in step 512 as to whether temperature Tcat of catalyst 70 is between threshold values T1 and T2. Threshold value T2 represents an upper level above which catalyst 70 is operating a peak efficiency. Temperature threshold T1 represents a lower level below which catalyst 70 cannot support an exothermic reaction between unburned fuel vapors and excess oxygen. In an alternative embodiment, threshold values T1 and T2 can represent threshold temperature of NOx trap 72. In this alternative embodiment, temperature of catalyst 70 Tcat may be too low to support exothermic reaction due to, for example, washout chemistry. However, NOx trap 72 may be within a temperature range to support exothermic reaction because of it different washcoat formulation. Therefore, in this alternative embodiment the temperature range for allowing purge during stratified operation can is based on temperature of both Tcat and Ttrp.

When catalyst temperature Tcat is within this range, or in the alternative embodiment, when trap temperature Ttrp is within the range, the routine continues to step 513, where a determination is made as to whether trap temperature Ttrp is less than control threshold temperature Tt1. If the answer to step 512 is YES, the routine continues to step 513 where the fuel vapor concentration ($\rho_{fc}$) in the cylinder is calculated as described previously herein with particular reference to FIG. 3.

Continuing with FIG. 5, a temperature error (e) is calculated in step 516 based on a desired temperature (Td) of NOx trap 72 and the actual temperature (Ttrp) of NOx trap 72. Then, in step 518, an initial control value (PRG_temp) is calculated based on a function (f) of error (e). In a preferred embodiment, function (f) represents a proportional, integral, and derivative controller, known to those skilled in the art as a PID controller. Then, in step 520, the initial control value (PRG_temp) is clipped based on the calculated fuel vapor concentration ($\rho_{fc}$) in the cylinder, as described previously herein with particular reference to FIG. 4. This operation prevents the temperature controller from adding too much fuel vapor from fuel system 130 and creating a combustible fuel vapor concentration in the cylinder. Finally, in step 522, clipped control signal (PRG_c) is limited based on temperature (Tcat) of catalyst 70, as described later herein with particular reference to FIG. 6 or FIG. 8.

Referring now to FIG. 6, a routine for limiting clipped control signal (PRG_c) is described so that temperature (Ttrp) of NOx trap 72 can be controlled to the desired level while preventing temperature (Tcat) from becoming too high. First in step 610, a determination is made as to whether temperature (Tcat) of catalyst 70 is less than a maximum allowable temperature (TuMAX). When the answer to step 610 is YES, control signal PRG is calculated based on the clipped value (PRG_c). Otherwise, control signal PRG is calculated based on the clipped value (PRG_c) and a function (f2) of maximum allowable temperature (TuMAX) and temperature (Tcat) of catalyst 70. In a preferred embodiment, function (f2) represents a proportional, integral, and derivative controller, known to those skilled in the art as a PID controller.

Figure 7:
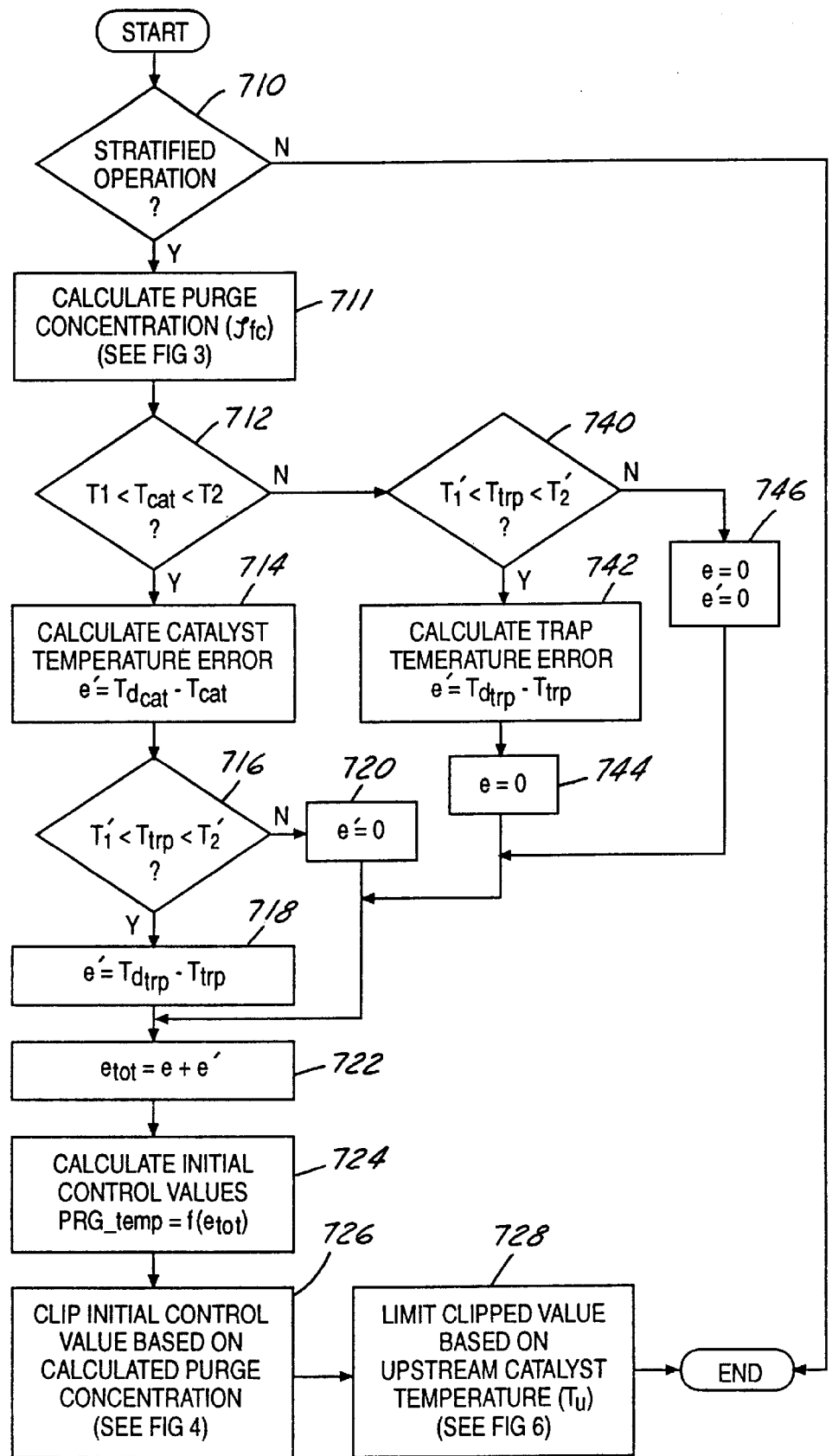

Referring now to FIG. 7, another alternative embodiment is described where purge vapors are controlled during stratified operation to maintain both temperature (Ttrp) of a NOx trap 72 downstream and temperature (Tcat) of catalyst 70. First, in step 710 a determination is made as to whether engine 10 is operating in a stratified mode where fuel is injected directly into cylinder 30 during a compression stroke. When the answer to step 710 is YES, the routine continues to step 514, where the fuel vapor concentration ($\rho_{fc}$) in the cylinder is calculated, as described previously herein with particular reference to FIG. 3. Then, in step 712, a determination is made as to whether temperature Tcat of catalyst 70 is between threshold values T1 and T2. Threshold value T2 represents an upper level above which catalyst 70 is operating a peak efficiency. Temperature threshold T1 represents a lower level below which catalyst 70 cannot support an exothermic reaction between unburned fuel vapors and excess oxygen. When the answer to step 712 is YES, a catalyst temperature error (e) is calculated in step 714 based on a desired catalyst temperature (Tdcat) of catalyst 70 and the actual temperature (Tcat) of catalyst 70.

Continuing with FIG. 7, in step 716 a determination is made as to whether temperature Ttrp of NOx trap 72 is between threshold values T1' and T2'. Threshold value T2' represents an upper level above which NOx trap 72 is operating a peak efficiency. Temperature threshold T1' represents a lower level below which NOx trap 72 cannot support an exothermic reaction between unburned fuel vapors and excess oxygen. When the answer to step 716 is YES, a trap temperature error (e') is calculated in step 718 based on a desired trap temperature (Tdtrp) of NOx trap 72 and the actual temperature (Ttrp) of NOx trap 72. Otherwise, trap temperature error (e') is set to zero in step 720. Then, in step 722, from either step 718 or 720, a total error (etot) is calculated from both trap temperature error (e') and catalyst temperature error (e). Then, in step 724 an initial control value (PRG_temp) is calculated based on a function (f) of total error (etot). In a preferred embodiment, function (f) represents a proportional, integral, and derivative controller, known to those skilled in the art as a PID controller. Then, in step 726, the initial control value (PRG_temp) is clipped based on the calculated fuel vapor concentration ($\rho_{fc}$) in the cylinder, as described previously herein with particular reference to FIG. 4. This operation prevents the temperature controller from adding too much fuel vapor from fuel system 130 and creating a combustible fuel vapor concentration in the cylinder. Finally, in step 728, clipped control signal (PRG_c) is limited based on temperature (Tcat) of catalyst 70, as described previously herein with particular reference to FIG. 6.

If the answer to step 712 is NO, then a determination is made in step 740 as to whether temperature Ttrp of NOx trap 72 is between threshold values T1' and T2'. When the answer to step 740 is YES, trap temperature error (e') is calculated in step 742 based on a desired trap temperature (Tdtrp) of NOx trap 72 and the actual temperature (Ttrp) of NOx trap 72. Then, in step 744, catalyst temperature error (e) is set to zero. Otherwise, trap temperature error (e') is set to zero and catalyst temperature error (e) is set to zero in step 746.

Accordingly, both emission control device temperatures are maintained above a value representing peak catalyst efficiency using unburned fuel vapor purge.

Figure 8:
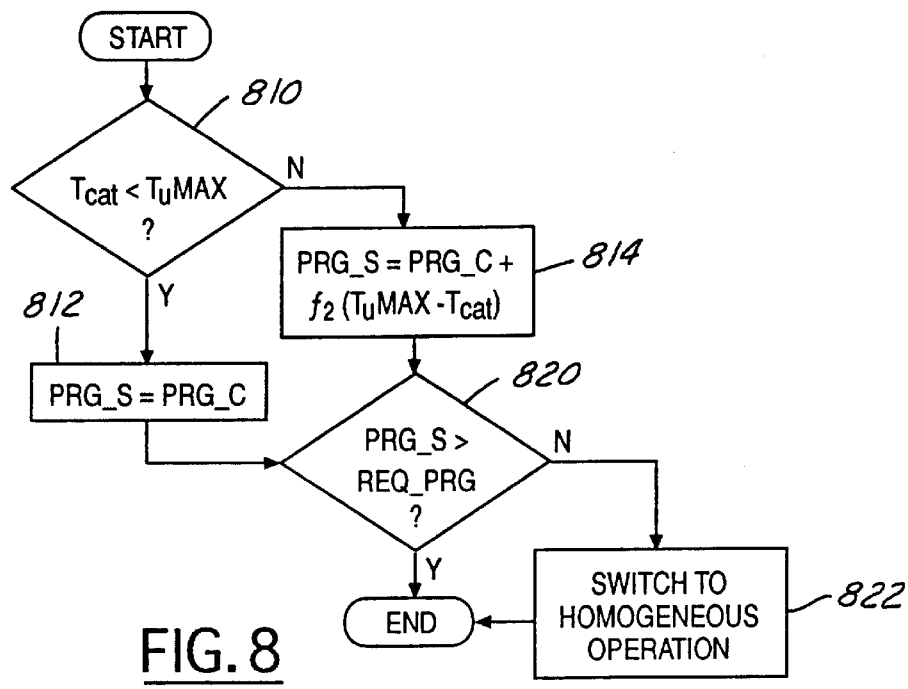

Referring now to FIG. 8, a routine for limiting clipped control signal (PRG_c) is described so that temperature (Ttrp) of NOx trap 72 can be controlled to the desired level while preventing temperature (Tcat) from becoming too high or stratified operation is discontinued if purge flow is too low. First, in step 810, a determination is made as to whether temperature (Tcat) of catalyst 70 is less than a maximum allowable temperature (TuMAX). When the answer to step 810 is YES, intermediate control signal PRG_S is calculated based on the clipped value (PRG_c). Otherwise, intermediate control signal PRG_S is calculated in step 814 based on the clipped value (PRG_c) and a function (f2) of maximum allowable temperature (TuMAX) and temperature (Tcat) of catalyst 70. In a preferred embodiment, function (f2) represents a proportional, integral, and derivative controller, known to those skilled in the art as a PID controller.

Then, in step 820, a determination is made as to whether intermediate control signal PRG_S is greater than required fuel vapor purge REQ_PRG. Required fuel vapor purge REQ_PRG is determined so that fuel system 130 does not become oversaturated with fuel vapors. When the answer to step 820 is NO, then additional fuel vapor purge is required. Since fuel vapor purge cannot be increased in the current mode without increasing engine torque or emission control device temperature, engine 10 is switched to homogenous operation in step 822. In an alternative embodiment, engine 10 is switched a split mode where both a homogeneous mixture and stratified mixture, both of which burn in the engine cylinders, are formed.

Figure 9:
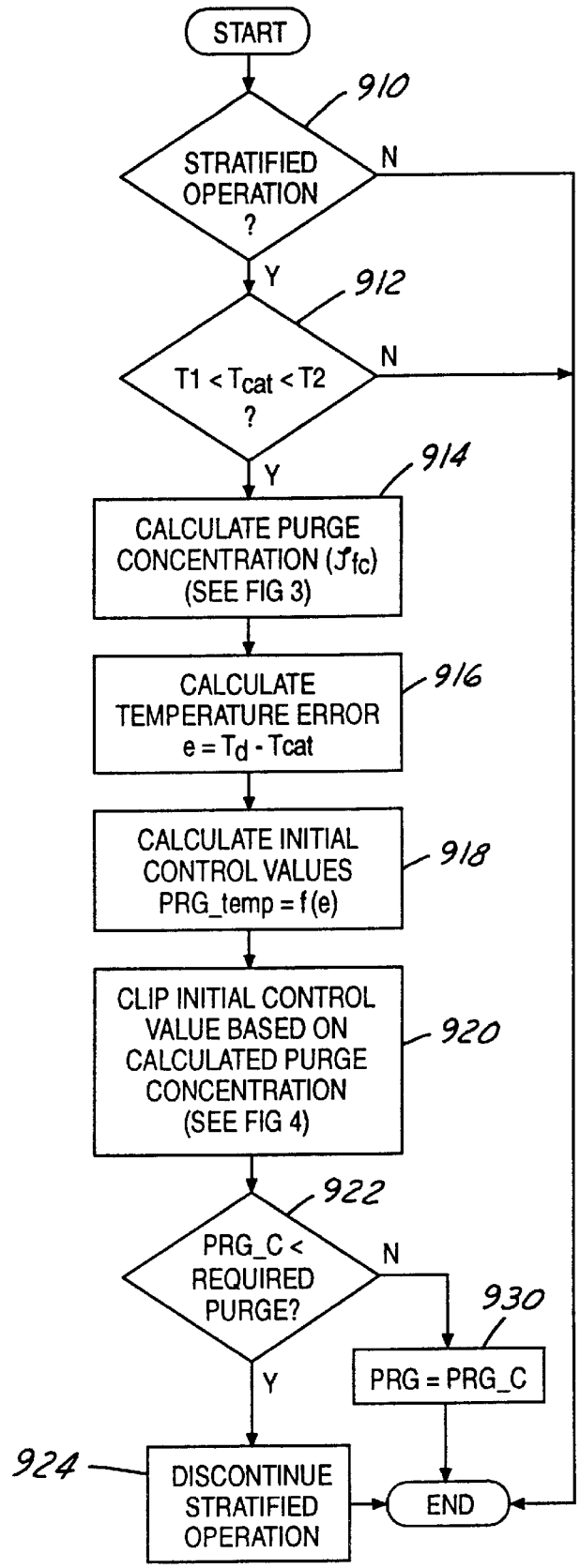

Referring now to FIG. 9, a routine for controlling temperature (Tcat) of catalyst 70 is described. First, in step 910, a determination is made as to whether engine 10 is operating in a stratified mode where fuel is injected directly into cylinder 30 during a compression stroke. When the answer to step 910 is YES, a determination is made as to whether temperature Tcat of catalyst 70 is between threshold values T1 and T2. Threshold value T2 represents an upper level above which catalyst 70 is operating a peak efficiency and thus control of temperature (Tcat) is not required. Temperature threshold T1 represents a lower level below which catalyst 70 cannot support an exothermic reaction between unburned fuel vapors and excess oxygen. When catalyst temperature Tcat is within this range, the routine continues to step 914, where the fuel vapor concentration ($\rho_{fc}$) in the cylinder is calculated, as will be described later herein with particular reference to FIG. 3.

Continuing with FIG. 9, a temperature error (e) is calculated in step 916 based on a desired temperature (Td) of catalyst 70 and the actual temperature (Tcat) of catalyst 70. Then, in step 918, an initial control value (PRG_temp) is calculated based on a function (f) of error (e). In a preferred embodiment, function (f) represents a proportional, integral, and derivative controller, known to those skilled in the art as a PID controller. Then, in step 920, the initial control value (PRG_temp) is clipped based on the calculated fuel vapor concentration ($\rho_{fc}$) in the cylinder, as described previously herein with particular reference to FIG. 4. This operation prevents the temperature controller from adding too much fuel vapor from fuel system 130 and creating a combustible fuel vapor concentration in the cylinder. Then, in step 922, a determination is made as to whether clipped value (PRG_c) is less than a required purge value to prevent saturation of fuel system 130. If the answer is YES, then in step 924, stratified operation is discontinues. Thus, engine 10 is operated in homogenous mode and purging is allowed at the required rate. Otherwise, in step 930, control signal PRG is calculated based on the clipped value (PRG_c).

Figure 10:
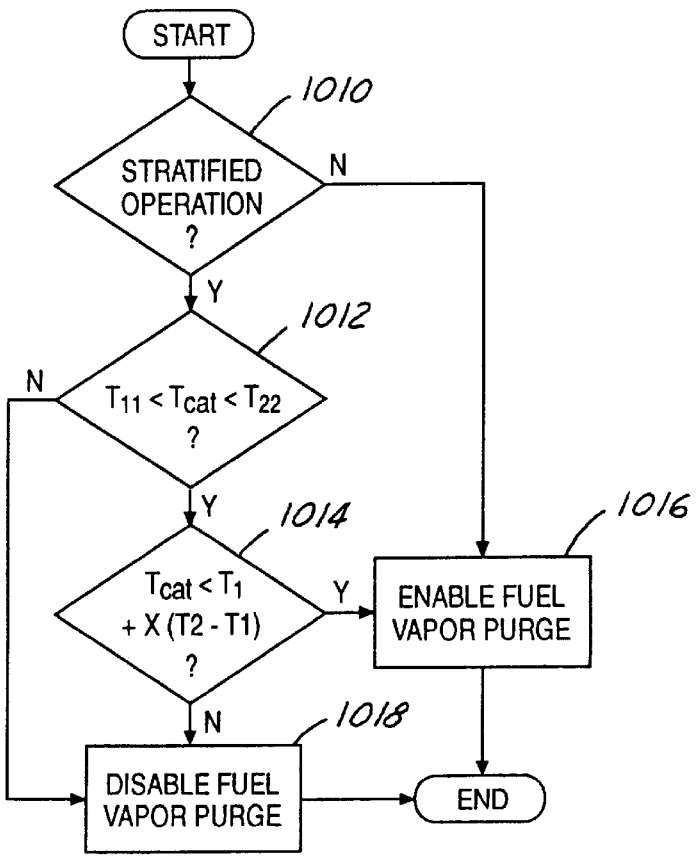

Referring now to FIG. 10, a routine for enabling fuel vapor purging is described. First, in step 1010, a determination is made as to whether engine 10 is operating in a stratified mode where fuel is injected directly into cylinder 30 during a compression stroke. When the answer to step 1010 is YES, a determination is made in step 1012 as to whether temperature Tcat of catalyst 70 is between threshold values T11 and T22. Threshold value T22 represents an upper level above which efficiency of catalyst 70 degrades. Temperature threshold T11 represents a lower level below which catalyst 70 cannot support an exothermic reaction between unburned fuel vapors and excess oxygen.

Continuing with FIG. 10, when the answer to step 1012 is YES, a determination is made in step 1014 as to whether catalyst temperature Tcat is in a lower portion of an allowable purge temperature range defined by T11 and T22, where parameter X represents a predetermined percentage of the allowable purge temperature range. Parameter X is based on engine operating conditions such as, for example, engine fresh air flow. When the answer to step 1010 is NO or step 1014 is YES, fuel vapor purging is enabled in step 1016. Otherwise, in step 1018, fuel vapor purging is disabled.

This concludes a description of an example in which the invention is used to advantage. Those skilled in the art will recognize that many modifications may be practiced without departing from the spirit and scope of the invention. For example, the invention can be carried out when operating in a purely stratified mode or when in a split mode, where both a stratified and homogenous mixture are formed. In addition, various emission control devices can be substituted for either catalyst 70 or trap 72. For example, a second trap could be used in place of catalyst 70. In this example, the routines using temperature of catalyst 70 would now use temperature of the second trap. Accordingly, it is intended that the invention be limited only by the following claims.

I claim:

1. A method for generating heat in an emission control device coupled to an engine having multiple combustion chambers, the method comprising:

operating in a stratified mode where fuel is injected during a compression stroke of the engine;

while operating in said stratified mode, purging fuel vapors into the combustion chambers that will pass through the chambers unburned, thereby providing unburned hydrocarbons and excess oxygen to react exothermically and generate heat in the emission control device.

2. The method recited in claim 1 wherein said fuel vapor purging is performed during an engine start to rapidly increase temperature of the emission control device.

3. The method recited in claim 1 wherein said purging is performed when a temperature of the emission control device is less than a predetermined value.

4. The method recited in claim 1 wherein said purging is performed when a temperature of the emission control device is within a predetermined range.

5. The method recited in claim 4 wherein said predetermined range represents a temperature range where exothermic reactions are possible.

6. The method recited in claim 5, with said temperature range based on the emission control device washcoat materials.

7. The method recited in claim 1 wherein said fuel vapor purging is performed to increase temperature and desulfate the emission control device.

8. A control engine for an engine having multiple combustion chambers coupled to an emission control device, the method comprising the steps of:

operating in a stratified mode where fuel is injected during a compression stroke of the engine;

providing an indication of temperature of the emission control device; and while operating in said stratified mode, purging fuel vapors into the combustion chambers when said temperature is below a predetermined threshold, thereby providing unburned hydrocarbons and excess oxygen to react exothermically and increase said temperature.

9. The method recited in claim 8 further comprising the step of adjusting an amount of said purged fuel vapors based on said temperature and a desired emission control device temperature.

10. The method recited in claim 9 further comprising the step of limiting said amount of purged vapors based on engine operating conditions.

11. The method recited in claim 8 wherein said purging step further comprises purging fuel vapors into the combustion chambers when said temperature is above a preselected threshold, with said preselected threshold is less than said predetermined threshold.

12. The method recited in claim 8 wherein said fuel vapors are provided by a fuel vapor system comprising a fuel tank and a purge control valve.

13. The method recited in claim 12 wherein said adjusting step is performed by changing a position of said purge control valve.

14. An article of manufacture comprising:

a computer storage medium having a computer program encoded therein for controlling for an engine having multiple combustion chambers coupled to an emission control device, said computer storage medium comprising:

code for operating in a stratified mode where fuel is injected during a compression stroke of the engine;

code for providing an indication of temperature of the emission control device; and code for purging fuel vapors into the combustion chambers while operating in said stratified mode, when said temperature is below a predetermined threshold, thereby providing unburned hydrocarbons and excess oxygen to react exothermically and increase said temperature.

15. The article recited in claim 14 further comprising code for adjusting an amount of said purged fuel vapors based on said temperature and a desired emission control device temperature.

16. The article recited in claim 15 further comprising code for purging fuel vapors into the combustion chambers when said temperature is above a preselected threshold, with said preselected threshold is less than said predetermined threshold.

17. The article recited in claim 16 further comprising code for limiting said amount of the purged fuel vapors based on engine operating conditions.

18. The article recited in claim 17 wherein said fuel vapors are provided by a fuel vapor system comprising a fuel tank and a purge control valve.

19. The article recited in claim 18 wherein said adjusting is performed by changing a position of said purge control valve.

* * * * *